(12) United States Patent
Hummelt (10) Patent No.: US 8,038,770 B2
(45) Date of Patent: Oct. 18, 2011

(54) SEPARATOR FOR DEGASSING FLUID

(75) Inventor: Edward J. Hummelt, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 261 days.

(21) Appl. No.: 12/325,775

(22) Filed: Dec. 1, 2008

(65) Prior Publication Data
US 2010/0132545 A1    Jun. 3, 2010

(51) Int. Cl.
*B01D 53/22*    (2006.01)
(52) U.S. Cl. .............. 95/46; 95/45; 95/47; 95/52; 95/54; 95/254; 95/266; 96/4; 96/6; 96/8; 96/11; 96/193; 55/417; 55/420
(58) Field of Classification Search ............... 96/4, 6, 96/8, 10, 11, 193; 95/45, 46, 47, 52, 54, 95/254, 266; 55/417, 420; 210/640; 419/2
See application file for complete search history.

(56) References Cited

U.S. PATENT DOCUMENTS

| | | | |
|---|---|---|---|
| 3,751,879 A | 8/1973 | Allington | |
| 3,897,221 A * | 7/1975 | Salyer et al. ................... | 419/2 |
| 4,465,805 A | 8/1984 | Blizzard et al. | |
| 4,686,764 A | 8/1987 | Adams et al. | |
| 4,729,773 A * | 3/1988 | Shirato et al. ................. | 96/6 |
| 4,732,931 A | 3/1988 | Maxson | |
| 4,968,766 A | 11/1990 | Kendziorski | |
| 4,980,440 A | 12/1990 | Kendziorski | |
| 4,980,443 A | 12/1990 | Kendziorski | |
| 4,993,265 A | 2/1991 | Koen et al. | |
| 5,036,365 A | 7/1991 | Landa | |
| 5,037,932 A | 8/1991 | Maxson et al. | |
| 5,082,706 A | 1/1992 | Tangney | |
| 5,281,455 A | 1/1994 | Braun et al. | |
| 5,288,829 A | 2/1994 | Takago et al. | |
| 5,300,171 A | 4/1994 | Braun et al. | |
| 5,300,670 A | 4/1994 | Kobayashi | |
| 5,326,386 A * | 7/1994 | Lee et al. ...................... | 96/6 |
| 5,326,604 A | 7/1994 | Willaimson | |
| 5,326,611 A | 7/1994 | Kishita et al. | |
| 5,468,388 A | 11/1995 | Goddard | |
| 5,529,820 A | 6/1996 | Nomi et al. | |
| 5,616,403 A | 4/1997 | Eckberg et al. | |
| 5,624,977 A | 4/1997 | Takarada et al. | |

(Continued)

FOREIGN PATENT DOCUMENTS
EP    1840998 A2    10/2007
(Continued)

OTHER PUBLICATIONS

International Search Report for PCT/IB2009/007575.

*Primary Examiner* — Jason M Greene
(74) *Attorney, Agent, or Firm* — Rader, Fishman & Grauer PLLC (57) ABSTRACT

A separator for a hydraulic system is provided, including a substrate and a membrane. The substrate includes a substrate outer surface and a gas side expulsion area. The expulsion area is for expelling gas from the separator. The membrane is in communication with the substrate, and is for permeating gas to the substrate outer surface while substantially blocking ingression of fluid to the substrate. The substrate outer surface is for receiving gas. The substrate is for transporting gas from the substrate outer surface to the expulsion area.

18 Claims, 4 Drawing Sheets

U.S. PATENT DOCUMENTS

| | | |
|---|---|---|
| 5,670,097 A | 9/1997 | Duan et al. |
| 5,696,211 A | 12/1997 | Chung et al. |
| 5,698,320 A | 12/1997 | Ebisu et al. |
| 5,734,001 A | 3/1998 | Yamaguchi et al. |
| 5,753,318 A | 5/1998 | Eckberg et al. |
| 5,762,684 A * | 6/1998 | Hayashi et al. ............ 96/6 |
| 5,830,261 A | 11/1998 | Hamasaki et al. |
| 5,853,617 A | 12/1998 | Gallagher et al. |
| 5,876,604 A | 3/1999 | Nemser et al. |
| 5,914,154 A | 6/1999 | Nemser |
| 5,919,526 A | 7/1999 | Eckberg et al. |
| 6,074,703 A | 6/2000 | Eckberg et al. |
| 6,120,536 A | 9/2000 | Ding et al. |
| 6,126,721 A | 10/2000 | Nemser et al. |
| 6,343,129 B1 | 1/2002 | Pelrine et al. |
| 6,402,810 B1 | 6/2002 | Mayer et al. |
| 6,737,370 B2 | 5/2004 | Espe |
| 6,746,514 B2 * | 6/2004 | Bedingfield et al. ............ 95/46 |
| 6,755,899 B2 * | 6/2004 | Nagai ............ 96/6 |
| 6,913,040 B2 | 7/2005 | Crossman et al. |
| 6,971,411 B1 | 12/2005 | Draper |

FOREIGN PATENT DOCUMENTS

| | | | |
|---|---|---|---|
| GB | 1 373 252 | * | 11/1974 |
| GB | 1373252 A | | 11/1974 |

* cited by examiner

SEPARATOR FOR DEGASSING FLUID

TECHNICAL FIELD

The present disclosure relates to a separator, and in particular to a separator for degassing a fluid.

BACKGROUND

Hydraulic systems operate by circulating a hydraulic fluid repeatedly throughout the hydraulic system, where movement of the hydraulic fluid is used to selectively power hydraulic system components. As the hydraulic system operates, unwanted gas from certain hydraulic system components may permeate into the hydraulic fluid. If the hydraulic fluid becomes saturated with gas, the hydraulic system may experience issues, such as a decreased level of performance, unwanted noise, or even potential damage to the hydraulic system components. Manually purging the gas from the hydraulic fluid may be costly or time-consuming, and is not always an option on some types of hydraulic systems, especially hydraulic systems that are intended to be sealed for life.

In one approach, a separator may be utilized to remove the gas from the hydraulic fluid. There are several known types of separators for removing the gas trapped within the hydraulic fluid. The separator has the ability to absorb gas while limiting the absorption of hydraulic fluid.

In at least some types of separators, a polymer may be used to absorb the gas. The polymer may be designed to absorb the gas from the hydraulic fluid, while substantially restricting the hydraulic fluid from entering the separator. The polymer's physical properties may be modified in order to restrict ingress of the hydraulic fluid into the separator. In one example, the outer surface of the polymer is modified to change the polymer's microporosity and hydrophobic properties. However, producing polymers to have the ability to repel fluid while still being able to absorb gas may require complicated manufacturing processes, may be costly, and may have absolute pressure limits below those of modern high-pressure hydraulic work circuits.

Therefore, there exists a need to provide a cost effective separator for a hydraulic system that absorbs at least some of the gas from the fluid, while substantially restricting the flow of fluid into the separator.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

According to various exemplary illustrations described herein, a separator is provided. The separator may include a substrate and a membrane, where the substrate includes a substrate outer surface and a gas side expulsion area. The substrate may be for expelling gas from the separator. The membrane may be in communication with the substrate. The membrane may also be for permeating gas to the substrate outer surface, while limiting the ingression of fluid to the substrate. The substrate outer surface may be for receiving gas, and the substrate may also be for transporting gas received from the substrate outer surface to the expulsion area. The substrate may also include a series of pores located within the substrate for allowing gas to permeate through the substrate, where the substrate may be constructed from a sintered powder metal, and in one example the sintered powder metal may include a stainless steel. The powder particle size may be sized between approximately one (1) micron and approximately twenty (20) microns. The expulsion area of the substrate may be attached to a port for transporting gas, where the substrate outer surface may be in direct contact with at least of portion of the membrane. The membrane may be in contact with the entire substrate outer surface.

A method for degassing a fluid from a hydraulic system is also disclosed. The method may include receiving the fluid from the hydraulic system to a separator, where the separator includes a substrate and a membrane. The substrate may include a gas side expulsion area. The fluid may be isolated from at least a portion of a gas that is contained within the fluid. The membrane may be for permeating the gas and for limiting the ingress of fluid. The gas may be transported from the membrane to the expulsion area of the substrate. The gas may be removed from the separator to a port, where the port may be attached to the separator.

Figure 1:
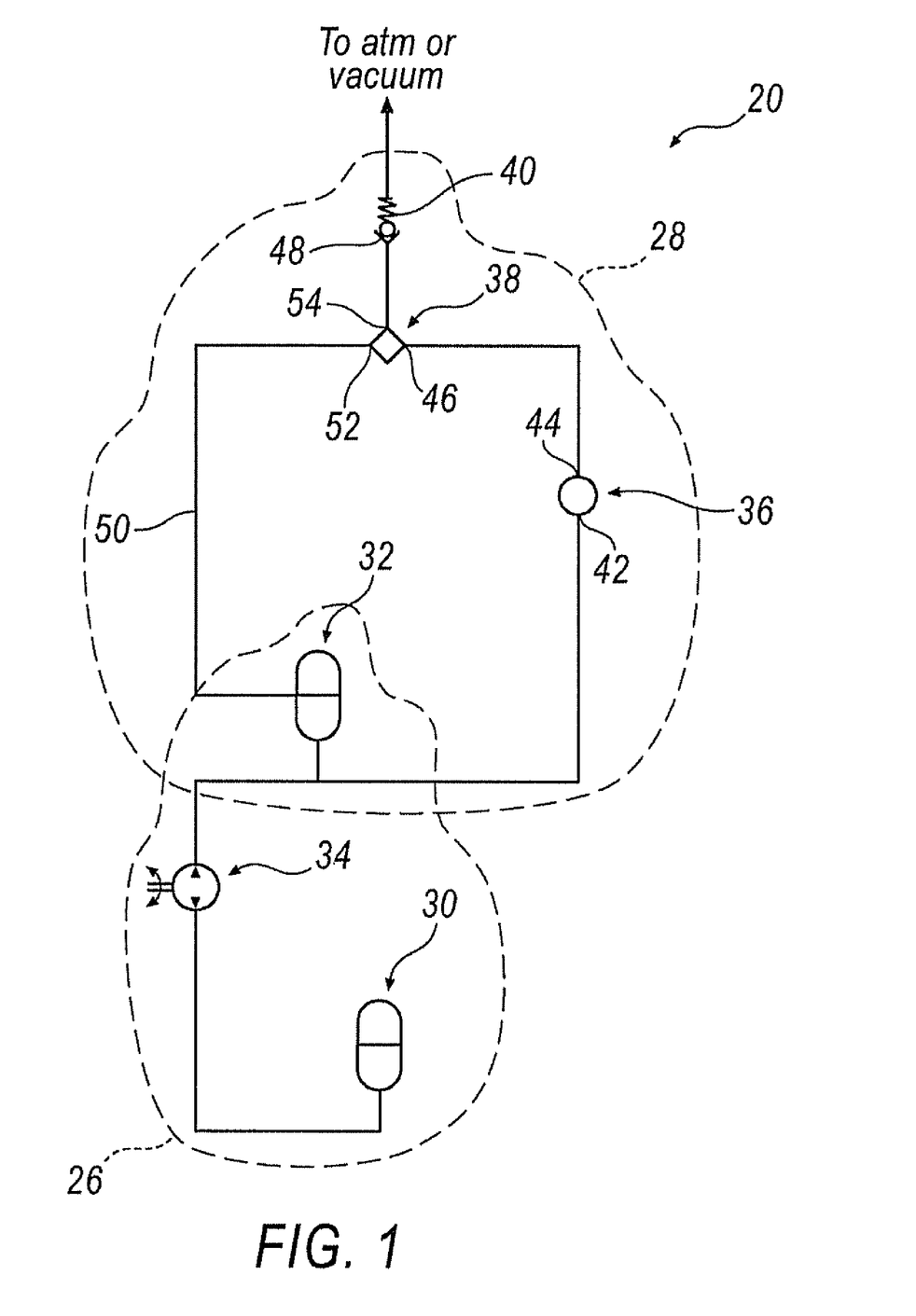
FIG. 1 is a schematic diagram of an exemplary hydraulic system including a high pressure accumulator, a low pressure accumulator, an integrated pump and motor, a secondary pump, a separator, and a check valve.

Turning now to the drawings, FIG. 1 illustrates an exemplary hydraulic system 20, illustrated as a schematic diagram. The hydraulic system 20 may include a high pressure accumulator 30, a low pressure accumulator 32, an integrated pump and motor 34, a secondary pump 36, a separator 38, and a check valve 40. A fluid 50 moves through the hydraulic system 20. In the illustration of FIG. 1, the fluid 50 may be a hydraulic fluid appropriate for use in a hydraulic system, such as, but not limited to, castor oil, glycol, mineral oil, or silicone. The pump and motor 34 moves the fluid 50 between the low pressure accumulator 32 and the high pressure accumulator 30. The secondary pump 36 moves the fluid 50 from the low pressure accumulator 32 through the separator 38 and then back to the low pressure accumulator 32. While FIG. 1 illustrates the hydraulic system 20 as a hydraulic system that is typically used with a hybrid powertrain of a vehicle, it is understood that any type of hydraulic system may be used as well. It should also be noted that while FIG. 1 illustrates the separator 38 being utilized in a hydraulic system, the separator 38 may be used in any application for degassing a fluid.

The pump and motor 34 may be fluidly connected to both of the low pressure accumulator 32 and the high pressure accumulator 30, and transports the fluid 50 between the low pressure accumulator 32 and the high pressure accumulator 30. In one example, the pump and motor 34 may be an integrated pump and motor that operates in a pump mode and a motor mode depending on the movement of the fluid 50 between a low pressure state (the low pressure accumulator 32) and a high pressure state (the high pressure accumulator 30). That is, the pump and motor 34 may operate forwards and in reverse, thereby controlling whether the pump and motor 34 operates as a pump, or as a motor.

When the pump and motor 34 operates forwards the pump and motor 34 may be in the pump mode. In the pump mode, the fluid 50 moves from the low pressure accumulator 32 to the high pressure accumulator 30. When in the pump mode, a device, such as, but not limited to, an engine drivetrain of a vehicle may extract kinetic energy from the fluid 50. When the pump and motor 34 operates in reverse pump and motor 34 may be in the motor mode. When in the motor mode, the fluid 50 moves from the high pressure accumulator 30 to the low pressure accumulator 32 and turns the motor portion of the pump and motor 34. It should be noted that while FIG. 1 illustrates an integrated pump and motor, a separate pump and a separate motor may be used as well.

The high pressure accumulator 30, the low pressure accumulator 32 and the pump and motor 34 create a hydraulic flow circuit used for transmitting kinetic energy from the fluid 50 to a device, and may be a power circuit 26. The fluid 50 moves between the high pressure accumulator 30 and the low pressure accumulator 32 by the pump and the pump and motor 34 in the power circuit 26. However, gasses that are located in some of the components of the power circuit 26 may permeate into the fluid 50. As a result, the fluid 50 may become saturated with gas, which may be harmful to the operation of the hydraulic system 20. Therefore, a degassing circuit 28 may be provided to remove at least part of the gas that may be trapped inside of the fluid 50.

The low pressure accumulator 32, the secondary pump 36, the separator 38 and the check valve 40 create the degassing circuit 28 that may be used to remove gas from the fluid 50. The degassing circuit 28 operates as the fluid 50 from the low pressure accumulator 32 is moved by the secondary pump 36 into the separator 38. The secondary pump 36 may be fluidly connected to the low pressure accumulator 32 and the separator 38. The secondary pump 36 includes a secondary pump fluid inlet 42 and a secondary pump fluid outlet 44. The low pressure accumulator 32 may be fluidly connected to the secondary pump 36 through the secondary pump fluid inlet 42. The separator 38 may be fluidly connected to the secondary pump 36 through the secondary pump fluid outlet 44. It should be noted that while FIG. 1 illustrates the degassing circuit 28 including a secondary pump 36 for facilitating movement of the fluid 50, in at least some degassing circuits the secondary pump may be omitted.

The separator 38 includes a separator fluid inlet 46 as well as two exits, a fluid exit 52 and a gas exit 54. The separator fluid inlet 46 fluidly connects the separator 38 to the secondary pump 36, and receives the fluid 50 from the secondary pump 36. The fluid exit 52 fluidly connects the separator 38 to the low pressure accumulator 32. The gas exit 54 connects the separator 38 to the check valve 40.

The separator 38 may be for removing at least a portion, if not substantially all of the gas that is trapped within the fluid 50. The fluid 50 that has been degassed exits the separator 38 through the fluid exit 52, and enters the low pressure accumulator 32. The fluid 50 from the low pressure accumulator 32 may then be moved through the power circuit 26. The check valve 40 may expel gas removed by the separator 38 from the hydraulic system 20.

The gas removed by the separator 38 may flow out of the gas exit 54 of the separator 38 and into the check valve 40. The check valve 40 may allow the gas to flow in one direction, where the direction of the flow is indicator by an arrow 48. That is, the check valve 40 allows for the fluid 50 to flow generally in one direction, which is out of the hydraulic system 20. The gas is then released from the hydraulic system 20. In one example the gas may be released into a vacuum or the atmosphere. It should be noted that while FIG. 1 illustrates the check valve 40, any device that substantially prevents the gas from re-entering into the hydraulic system 20 may be used as well.

In one example, the source of gas trapped in the fluid 50 may be located in the high pressure and the low pressure accumulators 30 and 32. This is because both of the accumulators 30 and 32 may contain an inert gas, such as, but not limited to nitrogen, that is stored in a bladder (not shown). The gas sometimes permeates through the bladder (not shown) located in the accumulators 30 and 32, and enters the fluid 50. It may be undesirable to have gas trapped within the fluid 50, because the hydraulic system 20 may experience a decreased level of performance, unwanted noise, or even potential damage to the hydraulic system components if there is gas aerated within the fluid 50. Therefore, the degassing circuit 28 may be provided to separate at the aerated gas from the fluid 50. It should be noted that gas from other sources, such as the atmosphere, may also become trapped within the fluid 50 as well.

Figure 2:
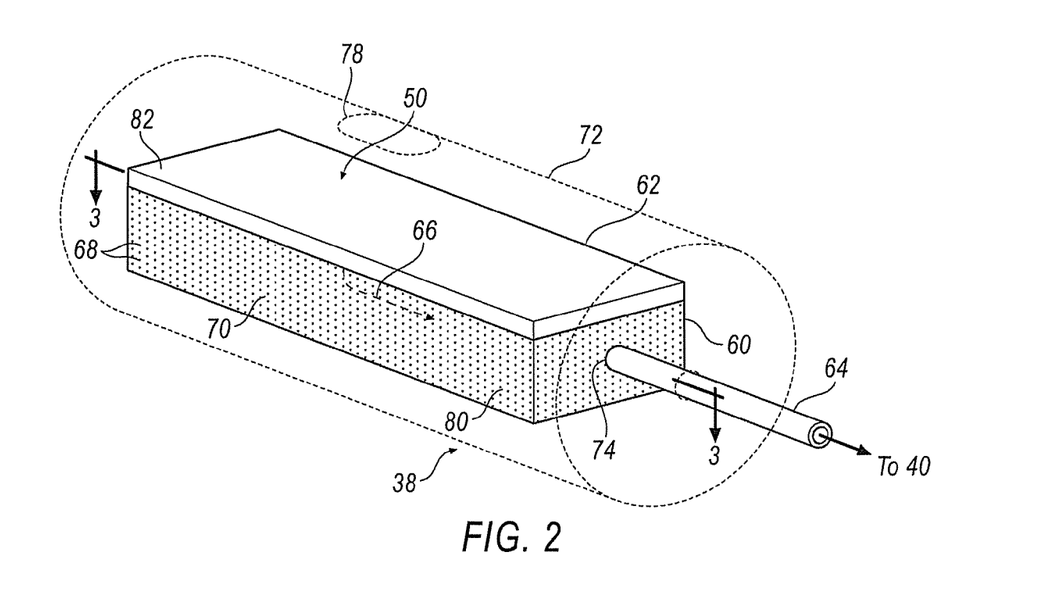
FIG. 2 is an elevational perspective view of the separator.

FIG. 2 is an illustration of a housing 72 that contains the separator 38 including a substrate 60, a membrane 62 and a port 64. The housing 72 may be any container that is able to withstand the surrounding pressure of the hydraulic fluid 50. The housing 72 includes an opening 78 where the fluid 50 enters the housing 72 and contacts the membrane 62. The substrate 60 includes a substrate outer surface 70, where the membrane 62 is in contact with and covers at least a portion of the substrate outer surface 70. The membrane 62 may be configured for allowing gas from the fluid 50 to permeate into the substrate 60. At the same time, the membrane 62 may also be used for limiting the ingression of the fluid 50 into the substrate 60. In one example, the membrane 62 substantially blocks the ingression of the fluid 50 into the substrate 60. It should be noted that while FIG. 1 illustrates the separator 38 as a hydraulic separator, the separator 38 may be used in any type of application where a fluid is degassed.

The membrane 62 may be in communication with the substrate 60 and transfer gas extracted from the fluid 50 to the substrate outer surface 70. The membrane 62 may also contain a gas concentration that is lower than the gas concentration of the fluid 50. The amount of gas located in the membrane 62 may be lower than the gas located in the fluid 50 such that the gas in the fluid 50 is attracted to the membrane 62 as the fluid 50 travels past the membrane 62, gas is extracted from the fluid 50.

The substrate 60 may be configured for transporting the gas extracted from the membrane 62 to a gas side expulsion area 74, where the substrate outer surface 70 may be in communication with the membrane 62. The expulsion area 74 of the substrate 60 corresponds with the gas exit 54 illustrated in FIG. 1. The expulsion area 74 may expel gas from the substrate 60, and may be in communication with the check valve 40 (illustrated in FIG. 1) by way of the port 64.

Figure 3:
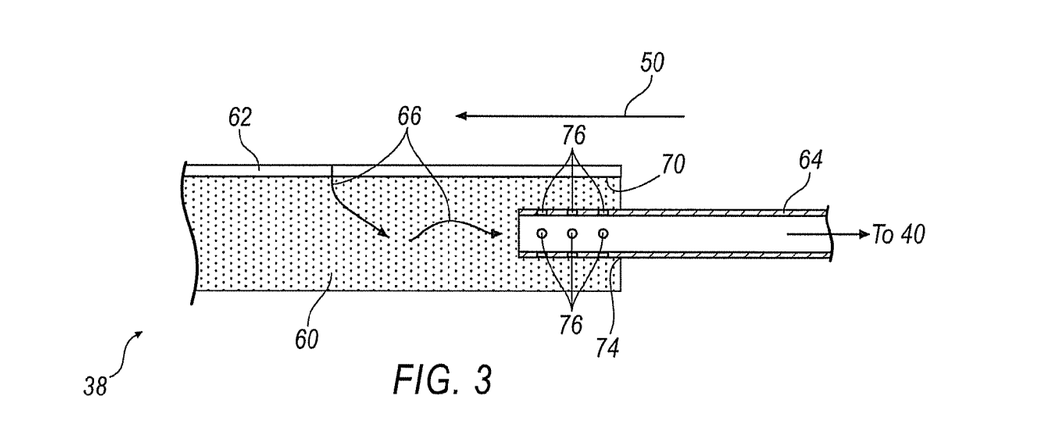
FIG. 3 is a partially cross sectional view of the separator in FIG. 2.

The membrane 62 may contact the fluid 50 and allow at least a portion of the gas trapped within the fluid 50 to permeate to the substrate outer surface 70, while substantially blocking the ingression of the fluid 50 into the substrate 60. FIGS. 2-3 illustrate the gas extracted from the fluid 50 by the membrane 62 as a gas flow 66. More specifically, the gas enters the substrate 38 though the membrane 62. The gas exits the membrane 62 as the gas flow 66. As illustrated in FIG. 3, the substrate 60 receives the gas flow 66 from the membrane 62, and may transport the gas flow 66 to the expulsion area 74.

Turning back to FIG. 2, the substrate 60 may be a porous, gas permeable material used to provide structural support to the membrane 62. The substrate 60 may be used to provide structural support because in some situations the membrane 62 may not have the physically properties, such as rigidity, to withstand the loads that are experienced from the hydraulic system 20. In other words, the membrane 62 may be a thin layer of material that is not self-supporting. Thus, the substrate 60 may become particularly important to provide structural support to the membrane 62.

The substrate 60 may be constructed from a variety of materials that are able to transport gas from the substrate outer surface 70 to the expulsion area 74. In one example, the substrate 60 may be constructed from a partially sintered powdered metal 80. One type of powdered sintered metal that may be used is a stainless steel. However, it should be noted that other types of metal may be used as well.

The substrate 60 may exhibit material properties that will maximize the gas flow 66 through the separator 38 and minimize the pressure differential between the substrate outer surface 70 and the expulsion area 74. In one exemplary illustration, the powdered sintered metal 80 includes a powder particle size ranging from approximately one (1) micron to approximately twenty (20) microns. Because the substrate 60 may be constructed from powdered sintered metal, a series of small pores 68 may be present in the surface and within the substrate 60. The pores 68 may allow the gas flow 66 to permeate through the substrate 60, where a larger pore size may result in greater gas permeability. However, an increase in pore size may be limited because the substrate 60 may still be needed to support the membrane 62: That is, there is a limit on how large the pores 68 may be, as the substrate 60 may still be needed for support. In one example, the size of the pores 68 may range from approximately 1 micron to approximately 10 microns.

The membrane 62 may be constructed from a material that includes the material property of gas permeability for allowing the permeation of the gas flow 66. The membrane 62 may be for substantially blocking the ingress of the fluid 50 into the substrate 60 as well. In one example, the membrane 62 may be constructed from a polymer, such as, for example, a flourosilicone 82. However, it should be noted that other materials may be used as well for the membrane 62 as well.

In at least some examples the flourosilicone 82 may be advantageous when used as the membrane 62. This is because the material properties of flourosilicone, such as high gas permeability, temperature resistance, heat aging and chemical resistance are typically compatible with a hydraulic system. Moreover, florosilicone may also have the ability to be produced into very thin, even sheets that may be bonded to the substrate outer surface 70. A thin, even layer of the membrane 62 over the substrate 60 may be particularly desirable, as a thin membrane 62 leads to high gas permeability in a small volume. That is, a thin membrane 62 may require less surface area 70 and result in a reduced mass. In one example, the flourosilicone 82 may be produced in layers as thin as approximately one tenth of a millimeter (0.0039 inches) to approximately five tenths of a millimeter (0.02 inches). However, it should be noted that while flourosilicone is used in this particular example, other materials may be used as well for the membrane 62.

Because the membrane 62 may be constructed from a material with high gas permeability, the use of multiple layers of membrane in the separator 38 for permeating gas and for limiting the ingress of fluid may not be needed in at least some applications. FIG. 3. illustrates the substrate outer surface 70 in direct contact with at least a portion of the membrane 62. That is, there may be no intermediate layer between the membrane 62 and the substrate outer surface 70, and each are bonded to one another. In at least some situations, bonding the membrane 62 directly to the substrate outer surface 70 may be advantageous for several reasons. First, bonding the membrane 62 directly to the substrate outer surface 70 may reduce the number of discrete elements in the separator 38. Moreover, bonding the membrane 62 directly to the substrate outer surface 70 may increase the gas permeation rate between the membrane 62 and the substrate 60, as there is no intermediate layer that the gas must travel through. Although FIG. 3 illustrates the substrate outer surface 70 in direct contact with a single layer membrane 62, it is understood that an intermediate agent may also be used to bond both the membrane 62 and the substrate 60 together, and the membrane 62 may be constructed from two or more layers as well. It should also be noted that flourosilicone and some other materials may not always readily create a permanent bond to surfaces such as the substrate outer surface 70. Therefore, an additive such as a primer may be added to the membrane 62 in order to improve bonding capabilities.

The attachment of the membrane 62 to the substrate outer surface 70 may be accomplished in a variety of ways, such as, but not limited to a mechanical attachment of pre-calendered film, molding, extrusion coating, or solution coating. It may be particularly advantageous to bond the membrane 62 to the substrate outer surface 70 by way of a solution coating, such a polymer solution coating. This is because a solution coating may provide a continuous film over the entire substrate outer surface 70. Therefore the entire substrate 60 may be entirely sealed by the membrane 62.

The expulsion area 74 of the substrate 60 may be in direct communication with the port 64 configured for transporting the gas flow 66. That is, there may be no other additional components between the substrate 60 and the port 64, and the port 64 may be attached to the substrate 60. The port 64 may be in communication with the gas flow 66, and transports the gas flow 66 to the check valve 40 (as illustrated in FIG. 1). In one example, the port 64 maybe constructed from a metal and attached directly to the substrate 60. The port 64 may be attached to the substrate 60 by a joining process such as, but not limited to, brazing or welding. The port 64 may also include a series of small openings 76 that are in communication with the pores 68, such that the gas flow may be communicated from the pores 68 through the opening 76. The small opening 76 may also decrease the pressure drop across the substrate 60.

Figure 4:
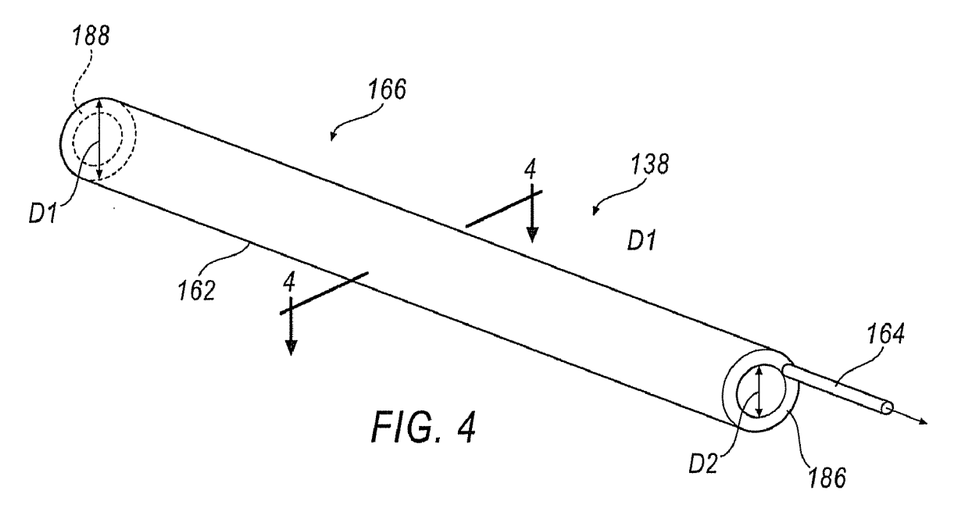
FIG. 4 is an alternative illustration of the separator in FIG. 2.
Figure 5:
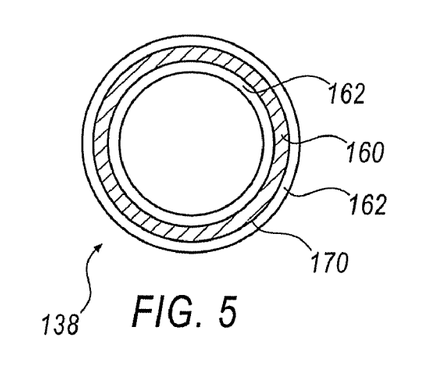
FIG. 5 is a partially cross sectional view of the separator in FIG. 4.

FIGS. 4-5 are alternative illustrations of a separator 138, where a substrate 160 may be in the form of a hollow tube. An entire substrate outer surface 170 may be covered by a membrane 162, and therefore the substrate 160 is not visible in FIG. 4. Instead FIG. 5, which is a partially cross sectional view of the separator 138, illustrates both of the substrate 160 as well as the membrane 162.

Turning back to FIG. 4, the separator 138 includes an outer diameter surface D1 and an inner diameter surface D2, as well as a front surface 186 and a rear surface 188 (shown in phantom line). The entire substrate 160 may be covered by the membrane 162, thus providing four surfaces where a gas flow 166 may be absorbed. In other words, each of the outer diameter surface D1, the inner diameter surface D2, the front surface 186 and the rear surface 188 may be covered by the membrane 162, therefore absorbing the gas flow 166. Having four different surfaces to absorb the gas flow 166 may be advantageous because the separator 138 has high gas absorbing abilities, while still maintaining a relatively small package size. Although FIGS. 2-3 illustrate the substrate 60 shaped as rectangular bar, and FIGS. 4-5 illustrate the substrate 160 as a hollow tube, the substrate may be produced in a variety of geometries depending on the application. In one example the substrate may be in the shape of a solid tube.

Figure 6:
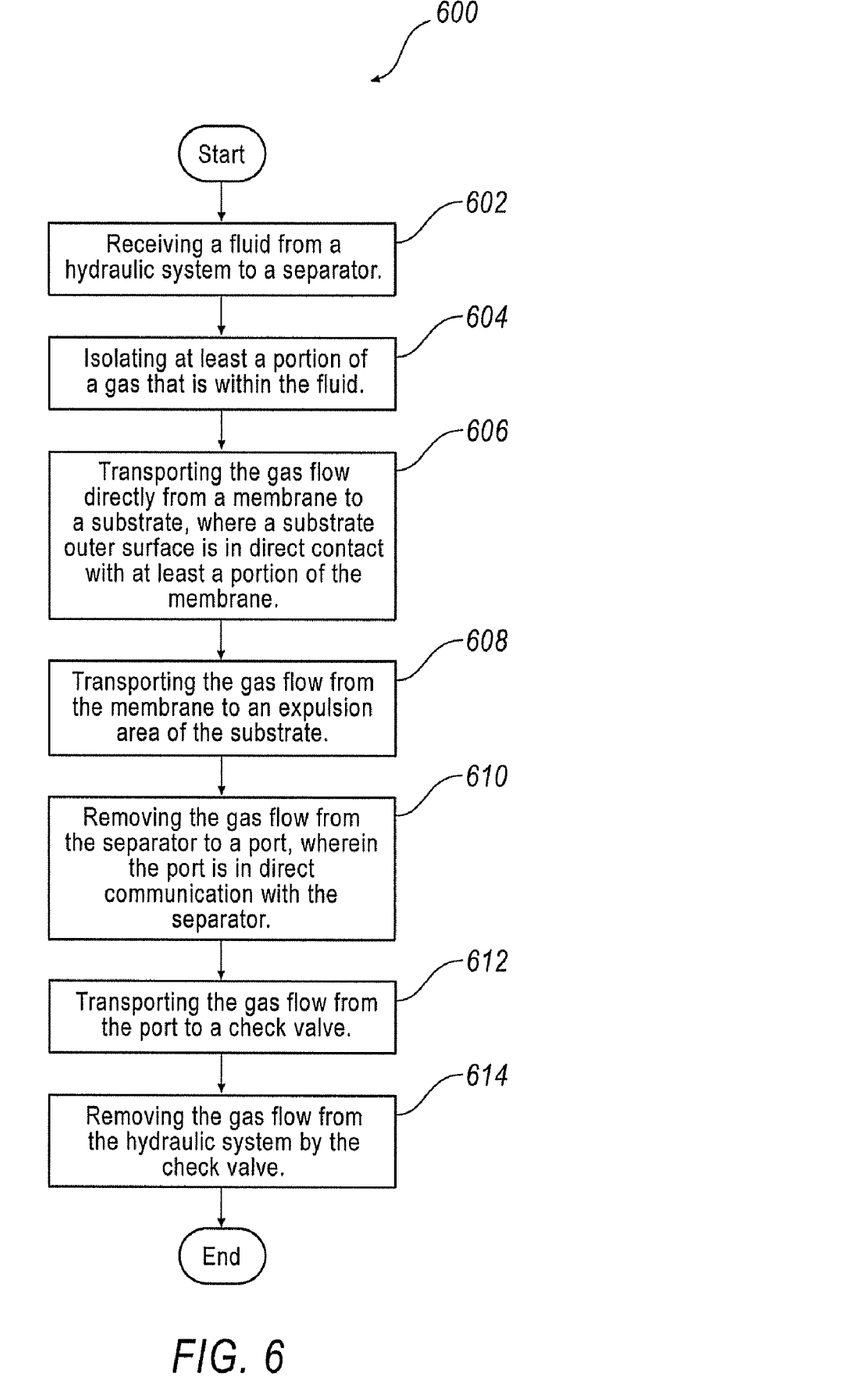
FIG. 6 is a process flow diagram of a method of degassing a fluid from a hydraulic system.

Turning now to FIG. 6, a process 600 of degassing the fluid 50 from the hydraulic system 20 is illustrated. Process 600 may begin at step 602, where the fluid 50 may be received from the hydraulic system 20 to the separator 38. As discussed above, the separator 38 includes the separator fluid inlet 46 that fluidly connects the separator 38 to the secondary pump 36 and receives the fluid 50 from the secondary pump 36. The separator 38 includes the substrate 60 and the membrane 62. The substrate 60 includes the expulsion area 74, where the expulsion area 74 may expel gas from the substrate 60. Process 600 may then proceed to step 604.

In step 604, the fluid 50 may be isolated from at least a portion of the gas that is trapped within the fluid 50 as the fluid 50 travels though the separator 38. More specifically, the membrane 62 may be configured for permeating gas and for limiting the ingress of fluid, such as the fluid 50. The membrane 62 may also be used for limiting the ingression of the fluid 50 into the substrate 60 and may also substantially block the ingression of the fluid 50 into the substrate 60. Additionally, the membrane 62 may also contain a gas concentration that is lower than the gas concentration of the fluid 50, such that the gas is drawn towards the membrane 62. As the fluid 50 travels past the membrane 62, gas may be extracted from the fluid 50. Process 600 may then proceed to step 606.

In step 606, the gas flow 66 may be transported from the membrane 62 directly to the substrate 60. This is because the substrate outer surface 70 may be in direct contact with at least of portion of the membrane 62. It should be noted that step 606 may be an optional step. This means that in an alternative example, an intermediate layer may be used to bond both the membrane 62 and the substrate 60 together. Process 600 may then proceed to step 608.

In step 608, the gas flow 66 may be transported from the membrane 62 to the expulsion area 74 of the substrate 60. As discussed above, the membrane 62 may be in contact with the fluid 50, where at least a portion of the gas trapped within the fluid 50 permeates through the membrane 62 and to the substrate outer surface 70. At the same time, the membrane 62 substantially blocks ingression of the fluid 50 into the substrate 60. Then, because the substrate outer surface 70 may be in communication with the membrane 62, the substrate 60 receives the gas flow 66. After receiving the gas flow 66 from the membrane, the substrate 60 transports the gas flow 66 from the substrate outer surface 70 to the expulsion area 74. Process 600 may then proceed to step 610.

In step 610, the gas flow 66 may be removed from the separator 38 by way of the port 64, where the port 64 may be in direct communication with the separator 38. The expulsion area 74 of the substrate 60 may be in direct communication with the port 64. This means that there may be no other additional components located between the substrate 60 and the port 64. Process 600 may then proceed to step 612.

In step 612, the gas flow 66 may be transported from the port 64 to the check valve 40. As seen in FIG. 1, the separator 38 may be in fluid communication with the check valve 40 by way of the port 64. It should be noted that while FIG. 1 illustrates the check valve 40, any device that substantially prevents the gas from re-entering into the hydraulic system 20 may be used. Process 600 may then proceed to step 614.

In step 614, the gas flow 66 may be removed from the hydraulic system 20 by the check valve 40. In one example, the gas flow 66 may be released into either an external environment or a vacuum, depending on the application. As discussed above, the check valve 40 may be configured for allowing the gas to flow in only one direction, where the direction of the flow is indicator by the arrow 48. The check valve 40 may be used to vent the gas flow 66 out of the hydraulic system 20, as well as to prevent at least most of the gas flow 66 from re-entering into the hydraulic system 20. Process 600 may then terminate.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. A separator for degassing a fluid, comprising:
   a substrate including a substrate outer surface and a gas side expulsion area, the expulsion area including at least one separator gas expelling port, the gas expelling port including at least one longitudinal opening and at least one lateral opening in communication with the longitudinal opening, and wherein at least one of the port openings and the expulsion area extends at least partially into the substrate; and
   a membrane in communication with the substrate, the membrane for permeating gas to the substrate outer surface while substantially blocking ingression of fluid into the substrate, and wherein the substrate outer surface is for receiving gas;
   wherein the substrate transports gas from the substrate outer surface to the expulsion area.

2. The separator as recited in claim 1, wherein the substrate includes a series of pores within the substrate for allowing gas to permeate through the substrate, and the substrate provides structural support for the membrane.

3. The separator as recited in claim 1, wherein the substrate outer surface is in direct contact with at least a portion of the membrane.

4. The separator as recited in claim 1, wherein the membrane is a flourosilicone.

5. The separator as recited in claim 1, wherein the substrate is constructed from a partially sintered powdered metal.

6. The separator as recited in claim 5, wherein the powder particle size is between approximately 1 micron and approximately 20 microns.

7. The separator as recited in claim 5, wherein the sintered powder metal is a stainless steel.

8. The separator as recited in claim 1, wherein the substrate is shaped as one of a hollow tube and a rectangular bar.

9. The separator as recited in claim 8, wherein the membrane is in contact with substantially the entire substrate outer surface.

10. A system for degassing a fluid in a hydraulic system, comprising:
    a separator including a substrate constructed from a partially sintered powder metal and a membrane, the substrate including a substrate outer surface and a gas side expulsion area, the expulsion area for expelling gas from the substrate, and the membrane in communication with the substrate; and
    a port including at least one longitudinal opening and at least one lateral opening in communication with the longitudinal opening, the openings for transporting gas out of the separator and into the hydraulic system, wherein the port is in communication with the expulsion area, and at least one of the port and the expulsion area extends at least partially into the sintered metal substrate;
    wherein the membrane is for permeating gas to the substrate outer surface while substantially blocking ingression of fluid to the substrate and the substrate outer surface is for receiving gas;
    wherein the substrate is for transporting gas from the substrate outer surface to the expulsion area.

11. The system as recited in claim 10, wherein the substrate includes a series of pores within the substrate for allowing gas to permeate through the substrate, and the substrate provides structural support for the membrane.

12. The system as recited in claim 10, wherein the port is for transporting gas from the separator to a check valve.

13. The system as recited in claim 12, wherein the check valve is in communication with one of an external environment and a vacuum.

14. The system as recited in claim 10, wherein the substrate outer surface is in direct contact with at least a portion of the membrane.

15. A method for degassing a fluid from a hydraulic system, comprising:
    receiving the fluid from the hydraulic system to a separator, wherein the separator includes a substrate constructed from a partially sintered powder metal and a membrane, the substrate including a gas side expulsion area;
    isolating the fluid from at least a portion of a gas that is contained within the fluid as the fluid is pumped across the membrane, wherein the membrane is for permeating the gas and for substantially blocking ingress of fluid;
    transporting the gas from the membrane to the expulsion area of the substrate, the expulsion area extends into the sintered metal substrate; and
    removing the gas from the separator to a port, wherein the port is at least one of attached to and extends into the substrate, the port includes at least one longitudinal opening and at least one lateral opening, the lateral opening is in communication with the longitudinal opening.

16. The method as recited in claim 15, further comprising the step of transporting the gas from the port to a check valve.

17. The method as recited in claim 16, further comprising the step of removing the gas from the hydraulic system by way of the check valve.

18. The method as recited in claim 15, further comprising the step of transporting the gas directly from the membrane to the substrate, wherein an outer surface of the substrate is in direct contact with at least a portion of the membrane.

* * * * *